(12) United States Patent
Gu

(10) Patent No.: US 8,957,632 B2
(45) Date of Patent: Feb. 17, 2015

(54) SYSTEM AND METHOD FOR COMPATIBLE WIRED CHARGING AND WIRELESS CHARGING

(75) Inventor: Yunfeng Gu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 409 days.

(21) Appl. No.: 13/509,961

(22) PCT Filed: Mar. 15, 2010

(86) PCT No.: PCT/CN2010/071051
§ 371 (c)(1),
(2), (4) Date: May 15, 2012

(87) PCT Pub. No.: WO2010/148667
PCT Pub. Date: Dec. 29, 2010

(65) Prior Publication Data
US 2012/0229084 A1   Sep. 13, 2012

(30) Foreign Application Priority Data

Nov. 25, 2009  (CN) .......................... 2009 1 0224256

(51) Int. Cl.
*H02J 7/00* (2006.01)
*H02J 7/02* (2006.01)

(52) U.S. Cl.
CPC .................................... *H02J 7/025* (2013.01)
USPC ......................................... 320/108; 320/138

(58) Field of Classification Search
None
See application file for complete search history.

(56) References Cited

U.S. PATENT DOCUMENTS

| 4,686,444 | A | 8/1987 | Park | |
|---|---|---|---|---|
| 2006/0103355 | A1* | 5/2006 | Patino et al. | 320/138 |

(Continued)

FOREIGN PATENT DOCUMENTS

| CN | 1571241 A | 1/2005 |
|---|---|---|
| CN | 200983137 Y | 11/2007 |
| CN | 201466761 U | 5/2010 |
| EP | 2073337 A1 | 6/2009 |
| JP | 2007336710 A | 12/2007 |
| JP | 2008178194 A | 7/2008 |

OTHER PUBLICATIONS

International Search Report on international application No. PCT/CN2010/071051, mailed on Sep. 9, 2010.
English Translation of the Written Opinion of the International Search Authority in international application No. PCT/CN2010/071051, mailed on Sep. 9, 2010.
Supplementary European Search Report in European application No. 10791173.7, mailed on Nov. 15, 2013.

*Primary Examiner* — Leigh Garbowski
(74) *Attorney, Agent, or Firm* — LeClairRyan, a Professional Corporation

(57) ABSTRACT

A system and method for enabling compatibility of wired charging with wireless charging are disclosed. The system includes an interface circuit, a wired charging unit and a wireless charging unit. The interface circuit is configured to connect the wired charging unit and the wireless charging unit to a power management unit; the wired charging unit is connected to the power management unit via an interface circuit and is configured to charge the power management unit by using a charging circuit in the power management unit; and the wireless charging unit is connected to the power management unit via the interface circuit and is configured to charge the power management unit by using the same charging circuit as that used by the wired charging unit. The method includes that an interface circuit connects a wired charging unit and a wireless charging unit to a power management unit, and the wireless charging unit and the wired charging unit use the same charging circuit in the power management unit to charge the power management unit. The system and method may avoid hidden dangers and guarantee display of the charging state of the terminal which is being charged in a wireless manner.

3 Claims, 2 Drawing Sheets

(56) References Cited

U.S. PATENT DOCUMENTS

| | | | |
|---|---|---|---|
| 2006/0105718 A1* | 5/2006 | Ozluturk et al. | 455/67.11 |
| 2009/0096413 A1* | 4/2009 | Partovi et al. | 320/108 |
| 2009/0140692 A1* | 6/2009 | Hwang | 320/108 |
| 2009/0156268 A1* | 6/2009 | Kim et al. | 455/573 |
| 2010/0033018 A1 | 2/2010 | Fukasawa | |
| 2011/0050164 A1* | 3/2011 | Partovi et al. | 320/108 |
| 2012/0200265 A1* | 8/2012 | Fukasawa et al. | 320/137 |

* cited by examiner

SYSTEM AND METHOD FOR COMPATIBLE WIRED CHARGING AND WIRELESS CHARGING

This application is a national stage application under 35 U.S.C. §371 from PCT Application No. PCT/CN2010/071051, filed Mar. 15, 2010, which claims the priority benefit of China Application No. 200910224256.X, filed Nov. 25, 2009.

TECHNICAL FIELD OF THE INVENTION

The disclosure relates to a technique for charging a terminal, and more particularly, to a system and method for enabling compatibility of wired charging with wireless charging.

BACKGROUND OF THE INVENTION

Currently, terminals have found an increasingly wide utilization in various aspects. Also, the terminals have become rich featured and various entertainments are involved. A terminal can be used to listen to music, watch TV or access to the Internet. Due to capacity limitation of a battery in a terminal, the terminal may run out of power after being used for a time period. As a result, the user of the terminal has to charge the battery frequently.

In the prior art, a terminal may be charged in wired and wireless manners at the same time. As shown in FIG. 1, a system currently used to charge a terminal includes a wired charging unit and a wireless charting unit, which charge a terminal using their respective charging circuits, such that the battery of the terminal may be charged in the wired and wireless manners at the same time within a allowable safe range of the battery. However, the existing system architecture has lead to the following two problems:

firstly, since the battery of the terminal can be charged in both paths for wired charging and wireless charging, flowing of currents in the both paths may cause an excessive current which may bring a hidden danger and shorten the service life of the battery; and secondly, display of the charging state of the terminal is performed by a base band unit activated by a power management unit. However, in accordance with the prior art, in the case of wireless charging, the wireless charging unit is not connected to the power management unit of the terminal. That is, the power management unit cannot activate a base band unit to display the charging state of the terminal, especially when the terminal is turned off.

No effective solution has been proposed to address the problems existing in the prior art.

SUMMARY OF THE INVENTION

In view of the above, it is the main object of the disclosure to provide a system and method for enabling compatibility of wired charging with wireless charging, such that for a terminal which can be charged in wired and wireless manners, hidden danger may be avoided and the terminal which is being charged in a wireless manner may display the charging state thereof.

In order to achieve the object as described above, the disclosure provides the following technical schemes.

A system for enabling compatibility of wired charging with wireless charging includes a wireless charging unit, a wired charging unit and a power management unit. The system further includes an interface circuit. The interface circuit is configured to connect both the wired charging unit and the wireless charging unit to the power management unit. The wired charging unit is connected to the power management unit via the interface circuit and is configured to charge the power management unit by using a charging circuit in the power management unit. The wireless charging unit is connected to the power management unit via the interface circuit and is configured to charge the power management unit by using the same charging circuit as that used by the wired charging unit.

The wired charging unit may be further configured to charge the power management unit via the interface circuit so as to cause a terminal in which the power management unit is located to enter a charging state normally and display the charging state on the terminal, where there is an output from the wired charging unit and no output from the wireless charging unit.

The wireless charging unit may be further configured to charge the power management unit via the interface circuit so as to cause a terminal in which the power management unit is located to enter a charging state normally and display the charging state on the terminal, where there is an output from the wireless charging unit and no output from the wired charging unit.

The wireless charging unit may be further configured to autonomously turn off an output from the wireless charging unit in response to detection of an access signal of the wired charging unit from the interface circuit, where there are outputs from both the wireless charging unit and from the wired charging unit. The wired charging unit may be further configured to charge the power management unit via the interface circuit so as to cause a terminal in which the power management unit is located to enter a charging state normally and display the charging state on the terminal, after the wireless charging unit enters a no output state.

A method for enabling compatibility of wired charging with wireless charging includes that an interface circuit connects both a wired charging unit and a wireless charging unit to a power management unit; and the wireless charging unit and the wired charging unit use a same charging circuit in the power management unit to charge the power management unit.

The interface circuit may be a path for charging the power management unit by the wired charging unit and the wireless charging unit.

The charging the power management unit may include: where there is an output from the wired charging unit and no output from the wireless charging unit, the wired charging unit charges the power management unit via the interface circuit so as to cause a terminal in which the power management unit is located to enter a charging state normally and display the charging state on the terminal.

The charging the power management unit may include: where there is an output from the wireless charging unit and no output from the wired charging unit, the wireless charging unit charges the power management unit via the interface circuit so as to cause a terminal in which the power management unit is located to enter a charging state normally and display the charging state on the terminal.

The charging the power management unit may include: where there are outputs from both the wireless charging unit and the wired charging unit, the wireless charging unit autonomously turns off the output from the wireless charging unit in response to detection of an access signal of the wired charging unit from the interface circuit; and after the wireless charging unit enters a no output state, the wired charging unit charges the power management unit via the interface circuit so as to cause a terminal in which the power management unit is located to enter a charging state normally and display the charging state on the terminal.

The system according to the disclosure further includes an interface circuit configured to connect both a wired charging unit and a wireless charging unit to a power management unit, the wired charging unit connected to the power management unit via the interface circuit and configured to charge the power management unit by using a charging circuit in the power management unit, and the wireless charging unit connected to the power management unit via the interface circuit and configured to charge the power management unit by using the same charging circuit as that used by the wired charging unit.

In contrast to two different charging circuits used in the prior art, only one charging circuit is used for both the wireless charging unit and the wired charging unit according to the disclosure, thus ensuring that there is only one path of current during a charging process, eliminating hidden dangers and prolonging the service life of the battery of the terminal. In addition, in the disclosure, with the interface circuit, both the wireless charging unit and the wired charging unit can be connected to the power management unit to charge the power management unit, and thus no matter wired or wireless charging is employed, the charging state may be displayed in the terminal.

DETAILED DESCRIPTION OF THE INVENTION

Figure 1:
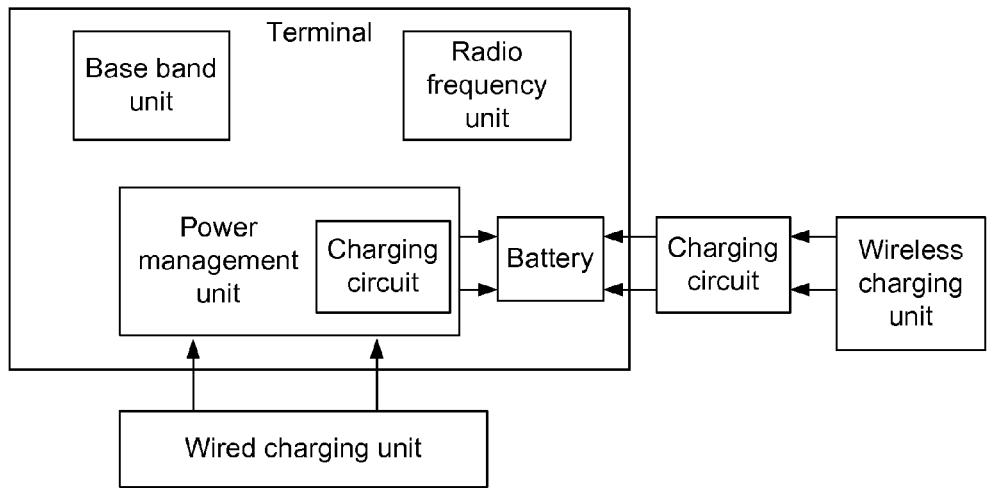
FIG. 1 is a block diagram of an existing system for charging a terminal in wired and wireless manners simultaneously.

The principle of the disclosure lies in that the system according to the disclosure further includes an interface circuit, which is configured to connect a wired charging unit and a wireless charging unit to a power management unit, wherein the wired charging unit is connected to the power management unit via the interface circuit, and is configured to charge the power management unit by using a charging circuit in the power management unit; and the wireless charging unit is connected to the power management unit via the interface circuit, and is configured to charge the power management unit by using the same charging circuit as that used by the wired charging unit.

The implementation of the technical scheme of the disclosure will be described below in detail with reference to the accompanying drawings.

A system for enabling compatibility of wired charging with wireless charging includes: a wireless charging unit, a wired charging unit and a power management unit. The system further includes an interface circuit. The power management unit may be arranged in a terminal such as a mobile phone terminal. The power management unit may include a charging circuit. The other components in the system except for the interface circuit are existing and will not be explained here in detail, and only the changes made herein on the existing components will be explained below.

The interface circuit is configured to connect both the wired charging unit and the wireless charging unit to the power management unit. The wired charging unit is connected to the power management unit via the interface circuit, and is configured to charge the power management unit by using the charging circuit in the power management unit. The wireless charging unit is connected to the power management unit via the interface circuit and is configured to charge the power management unit by using the same charging circuit as that used by the wired charging unit.

Specific implementations of the wired charging unit and the wireless charging unit in cases of different outputted currents will be described below.

Case 1: there is an output from the wired charging unit and no output from the wireless charging unit.

The wired charging unit is further configured to charge the power management unit via the interface circuit so as to cause a terminal in which the power management unit is located to enter a charging state normally and display the charging state on the terminal, where there is an output from the wired charging unit and no output from the wireless charging unit.

Case 2: there is an output from the wireless charging unit and no output from the wired charging unit.

The wireless charging unit is further configured to charge the power management unit via the interface circuit so as to cause a terminal in which the power management unit is located to enter a charging state normally and display the charging state on the terminal, where there is an output from the wireless charging unit and no output from the wired charging unit.

Case 3: there are outputs from both the wireless charging unit and the wired charging unit.

The wireless charging unit is further configured to autonomously turn off an output from the wireless charging unit in response to detection of an access signal of the wired charging unit from the interface circuit, where there are outputs from both the wireless charging unit and from the wired charging unit. Accordingly, there is no output from the wireless charging unit. Thus, by turning off the output from the wireless charging unit, the wireless charging unit can be switched from an outputting state to a no output state and thus enters the no output state.

The wired charging unit is further configured to charge the power management unit via the interface circuit so as to cause a terminal in which the power management unit is located to enter a charging state normally and display the charging state on the terminal, after the wireless charging unit enters the no output state.

A method for enabling compatibility of wired charging with wireless charging includes the following steps:

Step 101: an interface circuit connects both a wired charging unit and a wireless charging unit to a power management unit, here, the interface circuit refers specifically to a path for charging the power management unit by the wired charging unit and the wireless charging unit;

Step 102: the wireless charging unit and the wired charging unit use the same charging circuit in the power management unit to charge the power management unit.

The specific processes carried out in Step 102 in different cases are described below:

Case 1: there is an output from the wired charging unit and no output from the wireless charging unit.

In this case, the specific processes carried out in Step 102 include: the wired charging unit charges the power management unit via the interface circuit so as to cause a terminal in which the power management unit is located to enter a charging state normally and display the charging state on the terminal.

Case 2: there is an output from the wireless charging unit and no output from the wired charging unit.

In this case, the specific processes carried out in Step 102 include: the wireless charging unit charges the power management unit via the interface circuit so as to cause a terminal in which the power management unit is located to enter a charging state normally and display the charging state on the terminal.

Case 3: there are outputs from both the wireless charging unit and the wired charging unit.

In this case, the specific processes carried out in Step 102 include the following steps:

Step 1021: the wireless charging unit autonomously turn off an output from the wireless charging unit, in response to detection of an access signal of the wired charging unit from the interface circuit; and Step 1022: the wired charging unit charges the power management unit via the interface circuit so as to cause a terminal in which the power management unit is located to enter a charging state normally and display the charging state on the terminal, after the wireless charging unit enters a no output state.

The technical scheme of the disclosure provides a method for enabling compatibility of a wireless charging function with an existing terminal circuit, which may charge the terminal conveniently using the wireless charging function without affecting the wired charging function.

As to the system provided herein, the disclosure mainly includes the following contents.

The systemic architecture according to the disclosure includes: a wired charging unit, a wireless charging unit, a power management unit and an interface circuit. The power management unit may be arranged in a terminal, which may also include a base band circuit, a radio frequency unit and a battery. The power management unit includes a charging circuit; the wired charging unit transfers power to the power management unit in a wired transmission manner; the wireless charging unit transfers power to the power management unit in a wireless transmission manner; and the interface circuit is a path for powering the power management unit by the wired charging unit and the wireless charging unit.

As to the method provided herein, the disclosure mainly includes the following contents.

The method provided herein enables compatibility of a wireless charging function with an existing terminal circuit can implement both wired and wireless charging functions in a terminal, avoids a conflict that may otherwise exist between a wired charging unit for performing the wired charging function and a wireless charging unit for performing the wireless charging function, and enables the display of a charging state for either a wired charging process or a wireless charging process. Specifically, in a first case where there is an output from the wired charging unit and no output from the wireless charging unit, that is, where there is only an output from the wired charging unit currently, the wired charging unit charges the power management unit in the terminal via the interface circuit so that the terminal may be normally charged and display a charging state. In a second case where there is an output from the wireless charging unit and no output from the wired charging unit, that is, where there is only an output from the wireless charging unit currently, the wireless charging unit charges the power management unit in the terminal via the interface circuit so that the terminal may be normally charged and display the charging state. In a third case where there are outputs from both the wireless charging unit and the wired charging unit, that is, where there are outputs from both the wireless charging unit and the wired charging unit currently, once the wireless charging unit detects a signal indicating that the wired charging unit is accessing from the interface circuit, the wireless charging unit autonomously turns off the wireless charging unit, such that no output would issue from the wireless charging unit. As a result, at this time, only the wired charging unit powers the power management unit in the terminal via the interface circuit. That is, only the wired charging unit in the interface circuit supplies power to the power management unit in the terminal, such that the terminal may be normally charged and display the charging state.

For the third case, the charging process of inputting outputs from both the wired charging unit and the wireless charging unit to the interface circuit includes the following contents:

1) both the wireless charging unit and the wired charging unit have outputs to the interface circuit;

2) the interface circuit outputs a wired access signal to the wireless charging unit;

3) the wireless charging unit autonomously turns off the output from the wireless charging unit in response to detection of an access signal of the wired charging unit; and 4) the wired charging unit charges the power management unit in the terminal via the interface circuit so that the terminal enters a normal charging state.

In view of the above, the system and method provided herein effectively enable the circuit compatibility of wired charging with wireless charging, such that no conflict occurs between the wired charging unit and the wireless charging unit, for a terminal having both functions of wired charging and wireless charging. On one hand, both the wired charging unit and the wireless charging unit use the same charging circuit to charge a terminal, it is guaranteed that only one circuit is used during a charging process, thus avoiding hidden dangers and prolonging the service life of the battery in the terminal; on the other hand, both the wired charging unit and the wireless charging unit are connected to the power management unit via the same interface circuit. Therefore, no matter which charging manner is employed, wireless charging or wired charging, the charging state may be displayed on the terminal, such that it is convenient for a user to use the terminal and the user experience may be improved.

The disclosure will be explained below by way of illustration.

Figure 2:
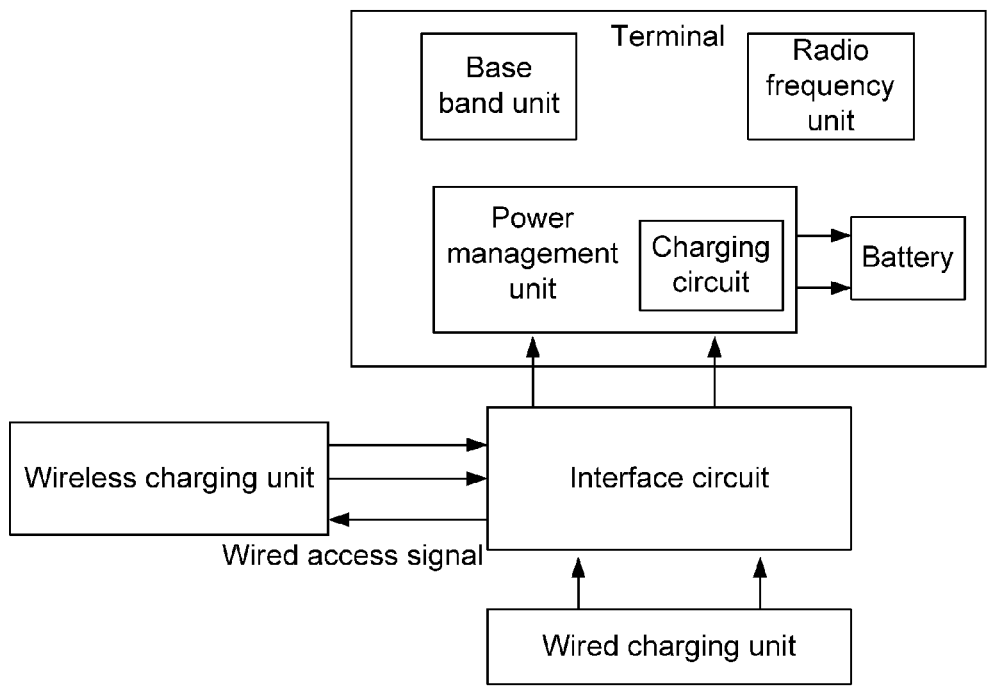
FIG. 2 is a block diagram of a system according to an embodiment for system of the disclosure.

An embodiment for the system:

As shown in FIG. 2, there are four components in the system: a terminal, an interface circuit, a wired charging unit and a wireless charging unit. The terminal is a core component. The terminal includes a base band unit, a power management unit in which a charging circuit is arranged, a radio frequency unit and a battery. The wired charging unit transfers power to the terminal in a wired transmission manner, while the wireless charging unit transfers power to the terminal in a wireless transmission manner; the interface circuit is a path for powering the terminal by the wired charging unit and the wireless charging unit. During a charging process, the power management unit in the terminal is charged, and then the power management unit intelligently outputs a charging current to the battery, such that the terminal is charged through the charge of the battery.

An embodiment for the method

Figure 3:
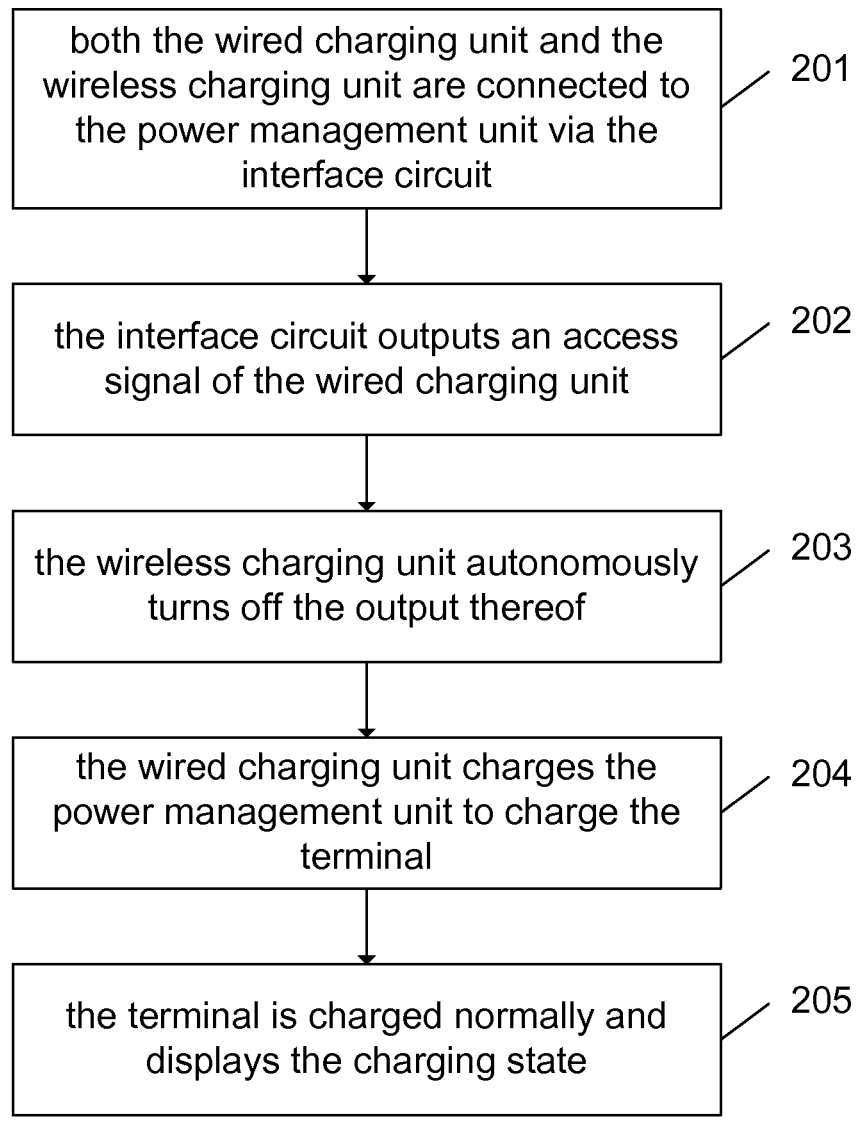
FIG. 3 is a flow chart illustrating implementation of a method according to an embodiment for method of the disclosure.

As shown in FIG. 3, this embodiment illustrates a charging flow carried out when both a wired charging unit and a wireless charging unit output access signals. This flow includes the following steps:

Step 201: both the wired charging unit and the wireless charging unit are connected to a power management unit via an interface circuit;

Step 202: the interface circuit outputs an access signal of the wired charging unit;

Step 203: the wireless charging unit autonomously turns off the output thereof;

Step 204: the wired charging unit charges the power management unit to charge the terminal; and Step 205: the terminal is charged normally and displays the charging state.

It should be noted here that the power management unit described above can be represented as PMU. As the wired charging unit is superior in priority to the wireless charging unit, that is, the wired charging unit is a preferred choice for charging the terminal, in the case where both the wired charging unit and the wireless charging unit output access signals, the wireless charging unit generally carries out a detection operation and then turns off the output thereof autonomously so as to enable the wired charging unit with a higher priority to charge the terminal.

What are mentioned above are merely preferred embodiments of the disclosure and are not intended to limit the scope of the disclosure.

The invention claimed is:

1. A system for enabling compatibility of wired charging with wireless charging, comprising:
- a wireless charging unit and a wired charging unit coupled to a power management unit by an interface circuit;
- the wired charging unit configured to charge the power management unit using a charging circuit in the power management unit;
- the wireless charging unit configured to charge the power management unit by using the charging circuit in the power management unit;
- the wireless charging unit further configured to autonomously turn off an output from the wireless charging unit in response to detection of an access signal of the wired charging unit from the interface circuit, where there are outputs from both the wireless charging unit and the wired charging unit; and
- the wired charging unit further configured to charge the power management unit via the interface circuit so as to cause a terminal in which the power management unit is located to enter a charging state normally and display the charging state on the terminal, after the wireless charging unit enters a no output state.

2. A method for enabling compatibility of wired charging with wireless charging, comprising:
- connecting, by an interface circuit, both a wired charging unit and a wireless charging unit to a power management unit; and
- charging, by the wireless charging unit or the wired charging unit, the power management unit through a charging circuit in the power management unit;
- wherein where there are outputs from both the wireless charging unit and the wired charging unit, the wireless charging unit autonomously turns off the output from the wireless charging unit in response to detection of an access signal of the wired charging unit from the interface circuit, and after the wireless charging unit enters a no output state, the wired charging unit charges the power management unit via the interface circuit so as to cause a terminal in which the power management unit is located to enter a charging state normally and display the charging state on the terminal.

3. The method according to claim 2, wherein the interface circuit comprises a path for charging the power management unit by the wired charging unit and the wireless charging unit.

* * * * *